(12) United States Patent
Ding et al.

(10) Patent No.: US 9,585,033 B2
(45) Date of Patent: *Feb. 28, 2017

(54) SYSTEM AND METHOD FOR ENHANCED DIAGNOSTICS ON MOBILE COMMUNICATION DEVICES

(71) Applicant: Future Dial Inc., Sunnyvale, CA (US)

(72) Inventors: Xinmin Ding, San Jose, CA (US); Chen Chen, Fremont, CA (US); Steven S. Chan, Fremont, CA (US); George Huang, Los Altos Hills, CA (US)

(73) Assignee: FUTURE DIAL, INC., Sunnyvale, CA (US)

( * ) Notice: Subject to any disclaimer, the term of this patent is extended or adjusted under 35 U.S.C. 154(b) by 118 days.

This patent is subject to a terminal disclaimer.

(21) Appl. No.: 14/506,529

(22) Filed: Oct. 3, 2014

(65) Prior Publication Data

US 2015/0024736 A1    Jan. 22, 2015

Related U.S. Application Data

(63) Continuation of application No. 13/162,523, filed on Jun. 16, 2011, now Pat. No. 8,855,627.

(Continued)

(51) Int. Cl.
*H04W 24/00* (2009.01)
*H04W 24/04* (2009.01)
*H04L 12/24* (2006.01)

(52) U.S. Cl.
CPC ......... *H04W 24/04* (2013.01); *H04L 41/0654* (2013.01); *H04W 24/00* (2013.01)

(58) Field of Classification Search
CPC ....... H04W 4/00; H04W 24/00; H04W 24/04; H04L 41/0654

(Continued)

(56) References Cited

U.S. PATENT DOCUMENTS 5,678,002 A    10/1997 Fawcett et al.
5,909,581 A    6/1999 Park (Continued)

OTHER PUBLICATIONS

"How Do I Backup my iPhone Before Updating Software" discussion by Mark Annfromacwoth, May 19, 2011, https://discussions.apple.com/thread/3067785?tstart=0.

(Continued)

*Primary Examiner* — Steve D Agosta
(74) *Attorney, Agent, or Firm* — Greenberg Traurig, LLP

(57) ABSTRACT

A system and method may include: providing to a device user in response to one of a user request for troubleshooting assistance and a mobile telecommunications user device monitoring software conclusion that a problem exists, a diagnostic application specific to the mobile telecommunication user device of the device user; receiving from the device user an indication of a problem with the mobile telecommunication user device experienced by the device user; selecting an application update; providing to the device user the application update updating an application running on the mobile telecommunication user device; and determining whether the problem has been solved. If determining indicates that the problem has not been solved the method may further include deleting the application and further determining whether the problem has been solved, and if so forwarding problem solution data to a knowledge database.

9 Claims, 16 Drawing Sheets

Related U.S. Application Data

(60) Provisional application No. 61/397,671, filed on Jun. 14, 2010.

(58) Field of Classification Search
USPC ............. 455/414.3, 418–420, 423, 425, 434; 370/310.2; 715/708, 709, 736; 714/31; 717/170; 710/30; 726/22, 24, 25
See application file for complete search history.

(56) References Cited

U.S. PATENT DOCUMENTS

| | | | |
|---|---|---|---|
| 6,151,643 | A | 11/2000 | Cheng et al. |
| 6,236,989 | B1 | 5/2001 | Mandyam et al. |
| 6,347,375 | B1 | 2/2002 | Reinert et al. |
| 6,801,971 | B1 | 10/2004 | Devine et al. |
| 6,918,059 | B1 | 7/2005 | Galuten et al. |
| 7,191,435 | B2 | 3/2007 | Lau et al. |
| 7,194,690 | B2 | 3/2007 | Guillermo et al. |
| 7,283,816 | B2 | 10/2007 | Fok et al. |
| 7,421,490 | B2 | 9/2008 | Bharati et al. |
| 7,493,107 | B2 | 2/2009 | Constabileo et al. |
| 7,784,098 | B1 | 8/2010 | Fan et al. |
| 7,865,578 | B1 | 1/2011 | Gerraty |
| 7,865,829 | B1 | 1/2011 | Goldfield et al. |
| 8,291,319 | B2 | 10/2012 | Li et al. |
| 8,516,308 | B1 | 8/2013 | Gill et al. |
| 8,719,814 | B2 | 5/2014 | Wookey |
| 8,855,627 | B2 | 10/2014 | Ding et al. |
| 8,996,916 | B2 | 3/2015 | Huang |
| 2001/0019956 | A1 | 9/2001 | Tada |
| 2002/0138786 | A1 | 9/2002 | Chefalas et al. |
| 2003/0070087 | A1 | 4/2003 | Gryaznov |
| 2003/0100299 | A1 | 5/2003 | Ko et al. |
| 2005/0091288 | A1 | 4/2005 | Ji et al. |
| 2006/0075494 | A1 | 4/2006 | Bertman et al. |
| 2006/0294274 | A1 | 12/2006 | Bennett |
| 2007/0233909 | A1 | 10/2007 | Derr et al. |
| 2008/0005262 | A1 | 1/2008 | Wurzburg et al. |
| 2011/0047414 | A1 | 2/2011 | Kudo et al. |
| 2011/0078510 | A1 | 3/2011 | Beveridge et al. |
| 2012/0084470 | A1 | 4/2012 | Antwerpen et al. |
| 2012/0166874 | A1 | 6/2012 | Bernardez et al. |
| 2012/0233605 | A1 | 9/2012 | Lupu et al. |
| 2012/0322439 | A1 | 12/2012 | Ding et al. |
| 2013/0047038 | A1 | 2/2013 | Huang |
| 2013/0059578 | A1 | 3/2013 | Finberg |
| 2013/0073864 | A1 | 3/2013 | Sarkar et al. |
| 2015/0205656 | A1 | 7/2015 | Huang |
| 2016/0249205 | A1 | 8/2016 | Huang |

OTHER PUBLICATIONS

Wikipedia's Skype version from Aug. 15, 2011 http://en.wikipedia.org/w/index.php?title=Skype&oldid=445010050.

Wikipedi'as Smartphone historical version published Aug. 10, 2011 https://en.wikipedia.org/w/index.php?title=Smartphone&oldid=443968736.

BlackBerry How to: Transfer Files Between Devices Using Bluetooth by Al Sacco Apr. 14, 2008 http://www.cio.com/article/243681 0/ mobile/blackberry-how-to-transf er-files-between-devices-us ing-bluetooth. html.

Wikipedia's Device Driver version from Aug. 2, 2011 https://en.wikipedia.org/w/index.php?title=Device_driver&oldid=442664872.

Belkin Hi-Speed USB 2.0 3-Port PCI Card User Manual published by Belkin 2003 http://www.belkin.com/support/dl/ p73941 ea-b_ f5u219ea.pd.

What is the Difference Between the USB Ports on the Front/Back of the Xbox 360 by Robotnik last updated Nov. 15, 2010 http://gaming.stackexchange.com/questions/10970/what-is-the-difference-between-the-usb-ports-on-theront-back-of-the-xbox-360.

Wikipedia's Conventional PCI historical version from Aug. 13, 2011 https://en.wikipedia.org/w/index.php?title=Conventional_PCI&oldid=444651235.

SYSTEM AND METHOD FOR ENHANCED DIAGNOSTICS ON MOBILE COMMUNICATION DEVICES

RELATED APPLICATIONS

The present application is a continuation application of U.S. patent application Ser. No. 13/162,523, filed Jun. 16, 2011 and entitled "System and Method For Enhanced Diagnostics on Mobile Communication Devices," which claims priority to, and the benefit of Prov. U.S. App. Ser. No. 61/397,671 entitled "System and Method For Enhanced Diagnostics on Mobile Communication Devices," filed on Jun. 14, 2010, the disclosures of which application are hereby incorporated herein in its entirety by reference.

BACKGROUND

A large cost is inflicted on cellular network operators by the user practice of returning devices for repair that are not actually defective. There are several reasons for this problem: some operating intermittencies may not be caught during in store testing of a defective device, or the problem may be caused by peripheral devices that are not returned with the supposedly faulty phone. A large portion of the problem may be attributed to user configuration errors, network configuration errors, or user software add-ons that are installable in the phone but may not be completely compatible with the particular phone set up and its particular network. Only a small fraction of returns are due to actual failure of the hardware.

In some cases more thorough diagnostics of devices with problems are needed than the diagnostics that are available currently. These diagnostics should not merely rely on internal functional diagnostics, but they should also include hardware configuration diagnostics, program configuration diagnostics, and network configuration diagnostics; and they should also look for other factors, including but not limited to program compatibility issues.

Often the exchange of data objects between different phones is desired or required. Some phones do not support such a feature; other phones have very limited ability. For example, such phones may allow exchange of an object such as a business card, but do not support exchange of pictures or other larger graphic images.

What is needed is a system and method for tracking and detecting device failures, and by doing so analyzing the problems and detecting the incorrect return of hardware, thus reducing dramatically the overall cost of network operations. What is also needed is a system and method that allows the exchange of any kind of object between two phones, whether exchange is originally supported by these phones or not, in a secure and safe manner.

DETAILED DESCRIPTION

Figure 1:
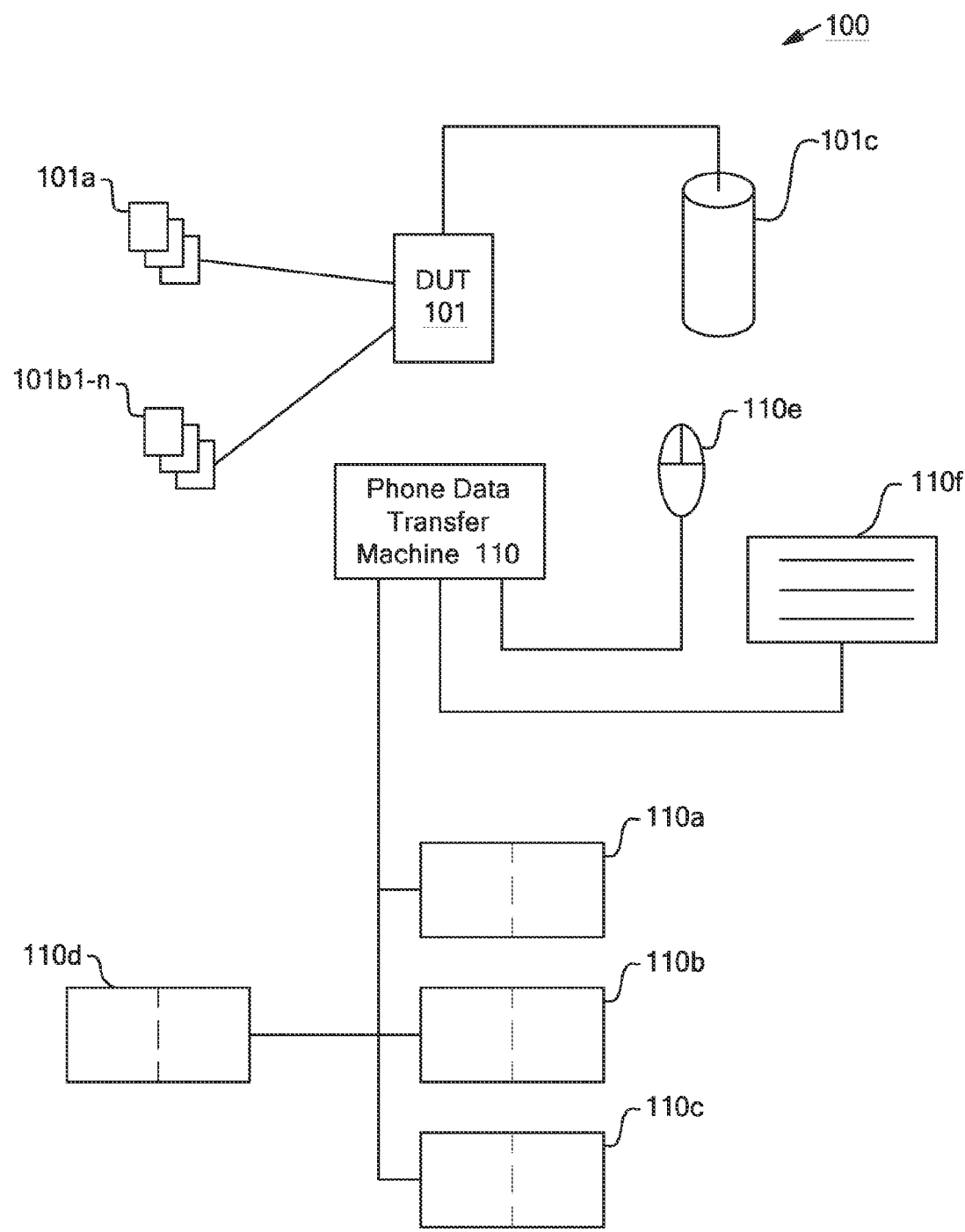
FIG. 1 shows an exemplary conventional telephone/PDA device data transfer station.

FIG. 1 shows an overview of an exemplary station 100 similar to typical telephone/PDA device data transfer stations as are currently in use and are known to the inventor. In FIG. 1, phone data transfer machine ("PDTM") 110 is typically a PC or other suitable computing device with universal serial bus ("USB") and/or Bluetooth connectivity or the like running phone data transfer applications such as PC Suite, PC Tools and/or other phonebook transfer applications. Such applications typically may connect one or two handsets (though only one shown here), such as the handset of a device under test ("DUT") 101 as shown in FIG. 1. The connections are typically made via USB cables 103 or custom cables (not shown, in lieu of 103). The computing device 110 may have a mouse interface 110e and a keyboard 110f and or other suitable input devices.

Each phone has its own operating system with software 101a and data sets 101b1-n. This data may contain all kinds of information, including, but not limited to, address book data, phone numbers, email addresses, pictures, video clips, and other types of data that may be used by cell phones and their applications. In some cases even the applications or the application data may be transferable.

Typically machine 110 would have its own operating system 110a, which has multiple programs 110b, including a test application 110b1 (not shown separately). Often machine 110 with operating system 110a and programs 110b is actually a custom, dedicated PC, and as such it has to contain drivers or dynamic link libraries ("DLLs") 110c for all the phones to which it may be connected. As a result of having a large library of DLLs (or drivers, used interchangeably here) almost any data transfers between two different phones can be utilized. The machine 110 can, by using the DLLs, communicate and download the data objects (each item typically comes down as one or more data objects from the phone, i.e., the DUT 101), which are then stored in machine 110 temporarily and eventually sent on to the other phone, as its data objects, using the matching DLL. It is clear that each of these devices has a CPU and memory, both volatile and nonvolatile, and thus each forms a small, distinct computing device, with some or all of the computing device components such as are shown by way of example in FIG. 4.

Figure 2:
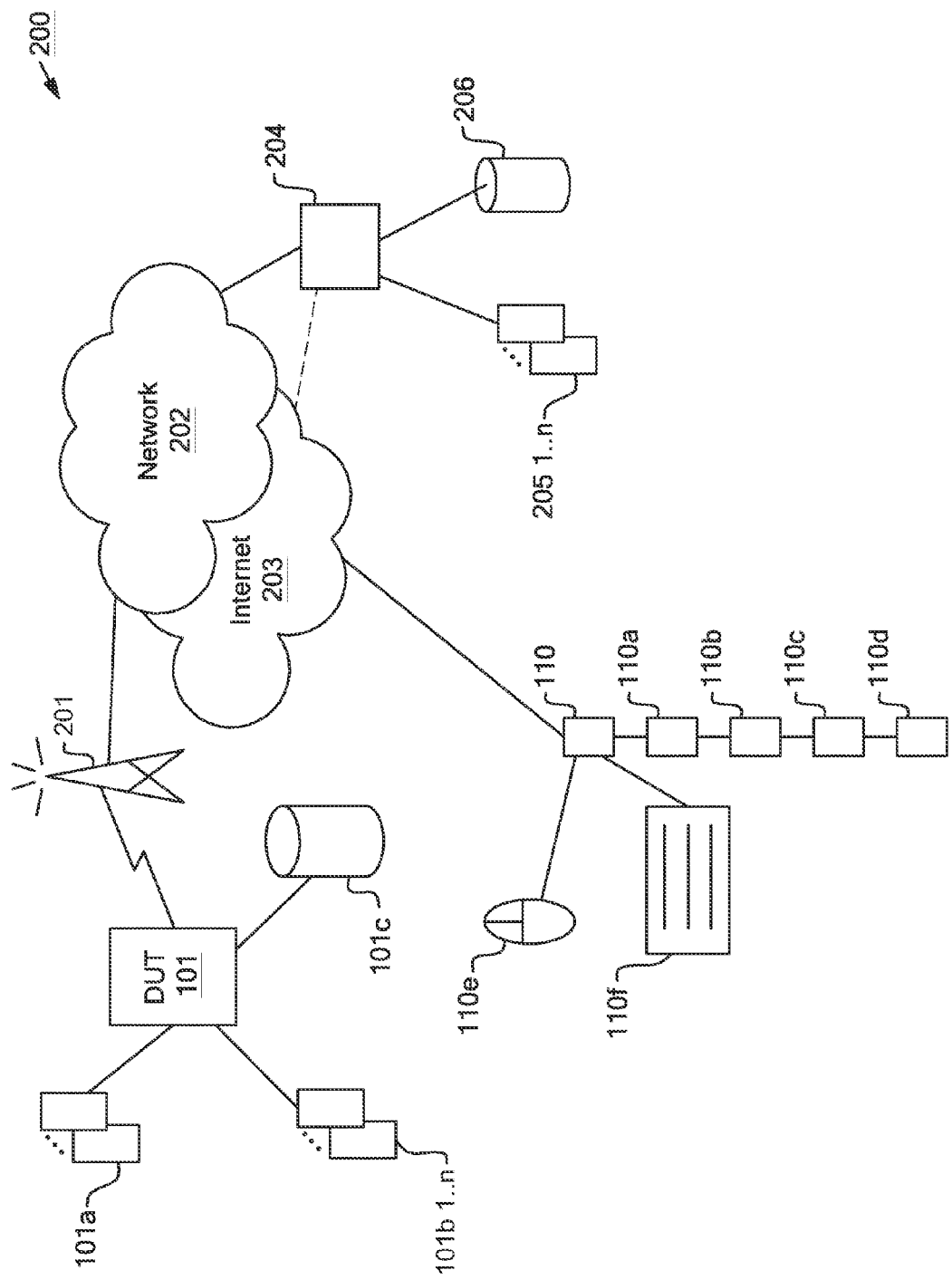
FIG. 2 shows a simplified exemplary testing system, using the same devices under test useful with aspects of the disclosed subject matter.

FIG. 2 shows a simplified overview of an example of a testing system 200, using the same DUT 101, according to one aspect of the disclosed subject matter. Here, rather than being connected to a hardware testing device, a test application 110ba (not shown separately) may, for example, be downloaded over the network 202 from a server 204, or from its data repository 206. In some cases the PDTM 110 may tell the server 204 which device, identified, e.g., by its electronic serial number ("ESN"), International Mobile Equipment Identity ("IMEI"), phone number, etc., should receive the application, as the network operator has the ability to send special system messages to remotely install software on devices.

Figure 3:
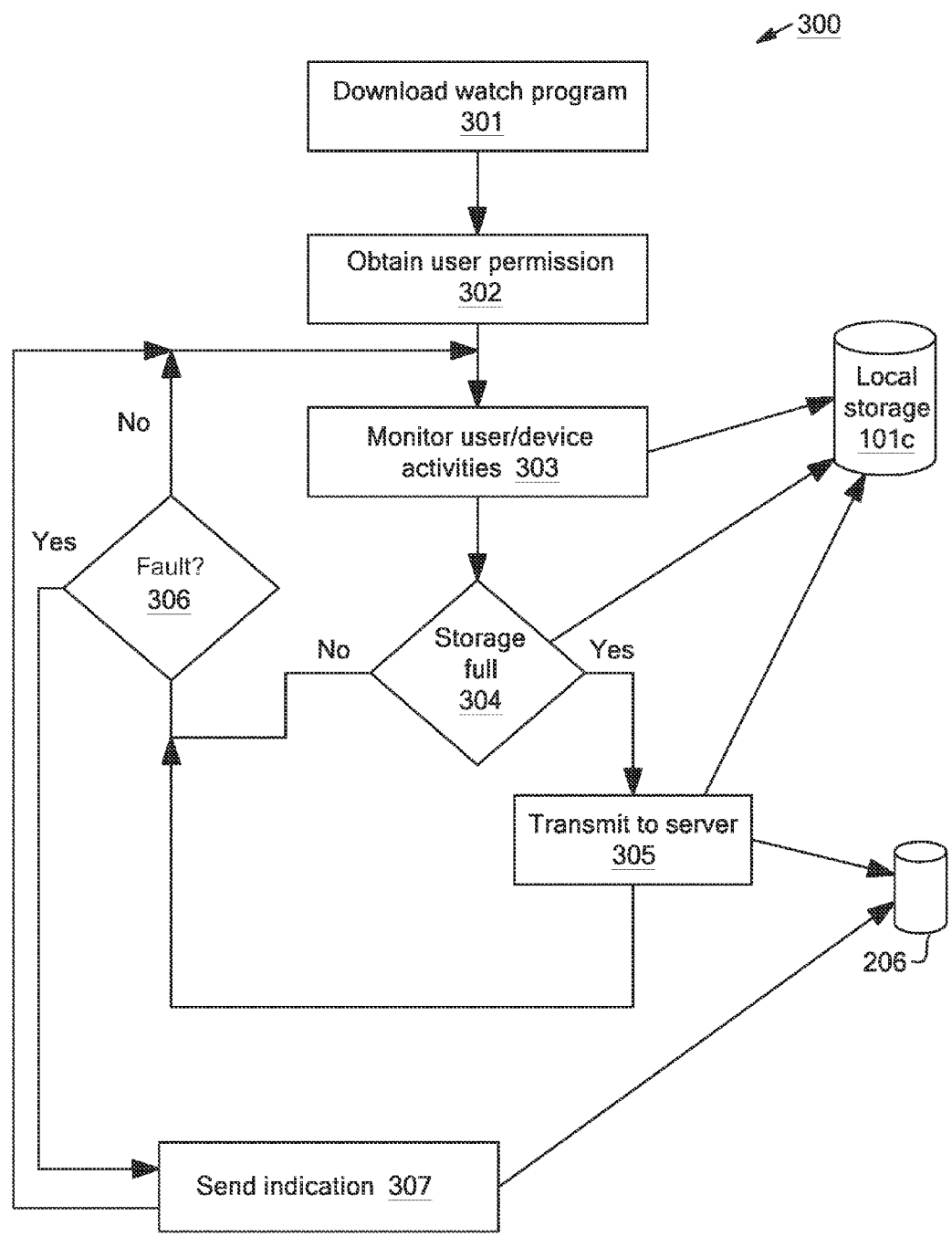
FIG. 3 shows an exemplary process for implementation of the use of system test software useful with aspects of the disclosed subject matter.

FIG. 3 shows an example of a process 300 for implementation of the system test software. In operation 301 the system downloads a monitoring application ("watch program") onto a target device. In operation 302, the system obtains user permission to run the monitoring application. In addition to asking a simple Yes or No question, the system 200 may require the user to enter a password, such as, an account password or the user password for this device, to verify that this is not an illegal attempt to install software on the device. In operation 303, the program starts to monitor user and device activities, such as cell changes, roaming table updates, installation and activation of plug-in software, phone calls, etc. Other monitored data includes preferred roaming list (PRL), battery operation, temperature control, logging of radio frequency ("RF") signal in and out during various operations, etc.

In some cases, it is also possible to obtain a pre-crash memory dump, which may be stored in the local storage 101c of mobile telecommunications user device 101. Local storage 101c may be, for example, a segregated section of nonvolatile memory in the device, which would preferably survive a crash without losing data. Also, in operation 304 the system monitors the remaining capacity of local storage 101c. When the storage 101c reaches a preset threshold of occupied space (yes), it is considered full and the process 300 moves to operation 305, where the system 200 now sends data to data repository 206 on server 204, from where it can be analyzed either automatically or on demand when a customer comes to a store or repair depot to complain about the phone.

From operation 305 or, if the local storage is not yet full (no), from operation 304, the process moves to operation 306. There, the system 200 analyzes the data transmitted by the downloaded application and stored either in local storage 101c or data repository 206. If the system does not detect a fault, the process loops back to operation 303, where the system continues to monitor the mobile telecommunications user device.

If the system 200 detects a fault (yes), the process moves to operation 307, where the system 200 sends a fault indication to data repository 206 of server 204. Server 204 may be running programs to respond to the fault indication by, for example, sending an email to the user of the mobile telecommunications user device 101 explaining the problem. A copy of this email may also be sent to the phone number's account log at the network operator's system, or, in other cases, only to the network operator's system.

After the email is sent, the process loops back to operation 303, where the system continues to monitor the device. By making certain data anonymous, abuses of access to and the use of the data may be reduced. Also, server 204 may keep a log of who has access to the phone data, who uses the data, and how it is used. These measures may reduce the incidence of unauthorized employee snooping into the phone usage of certain customers, such as, for example, celebrities.

Figure 4:
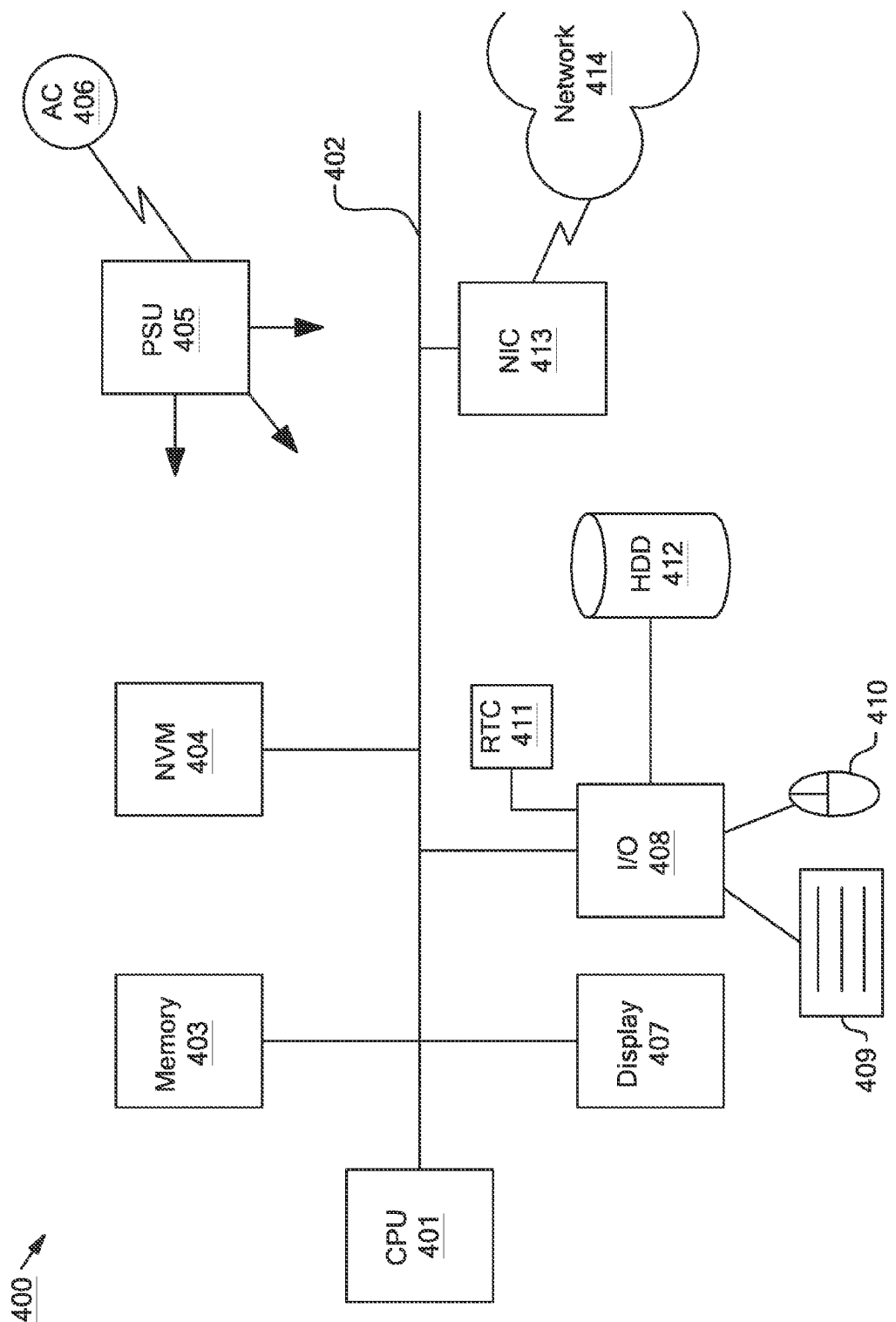
FIG. 4 shows an exemplary conventional computer system that may be used in any of the various locations throughout the system and method of the disclosed subject matter.

FIG. 4 shows an exemplary overview of a computer system 400 as may be used in any of the various locations throughout system 100. It is exemplary of any computer that may execute code to process data. Various modifications and changes may be made to computer system 400 without departing from the broader spirit and scope of the current invention. CPU 401 is connected to bus 402, to which bus is also connected memory 403, nonvolatile memory 404, display 407, I/O unit 408, and network interface card (NIC) 413. Input/output ("I/O") unit 408 may, typically, be connected to keyboard 409, pointing device 410, hard disk 412, and real-time clock 411. NIC 413 connects to network 414, which may be the Internet or a local network, which local network may or may not have connections to the Internet. Also shown as part of system 400 is power supply unit 405 connected, in this example, to ac supply 406. Not shown are batteries that could be present, and many other devices and modifications that are well known but are not applicable to the specific cases discussed herein.

Figure 5:
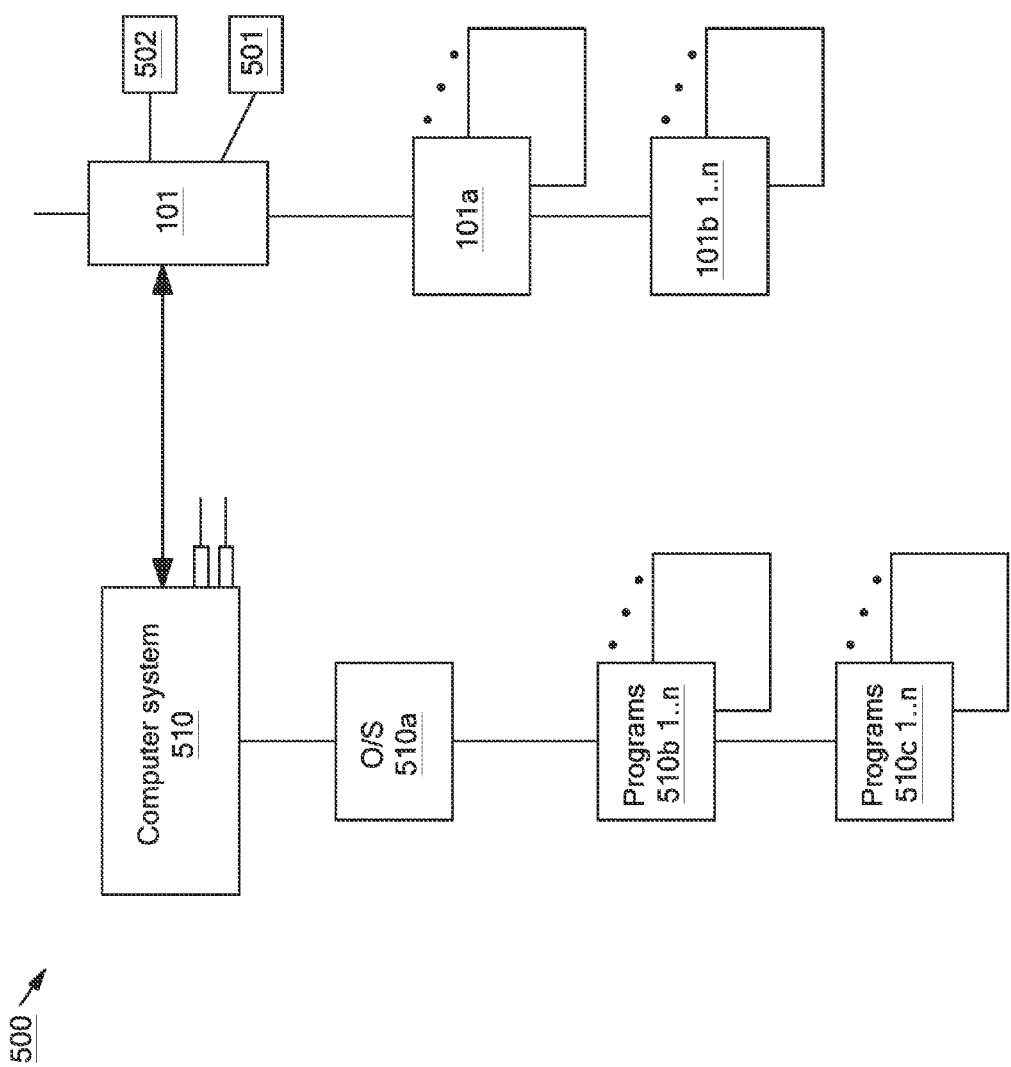
FIG. 5 shows an example of a typical telephone/personal data assistant ("PDA") device data transfer station which can be utilized with the system and method according to the disclosed subject matter.

FIG. 5 shows a more detailed overview of an exemplary system 500 similar to typical telephone/PDA device data transfer stations as are currently in use and are known to the inventor. In FIG. 5, testing computer 510 is typically a PC with USB and Bluetooth connectivity running phone data transfer applications such as PC Suite, PC Tools and other phonebook transfer applications, which typically may connect one or two handsets, such as the handset of a device under test (DUT) 101 as shown in FIG. 5.

The connections are typically made via USB cables 503 or custom cables 504. Each phone 101 has its own operating system with software 101a and data sets 101b1-n. This data may contain all kinds of information, including, but not limited to, address book data, phone numbers, email addresses, pictures, video clips, and other types of data that may be used by cell phones and their applications. In some cases even the applications or the application data may be transferable.

Typically the testing computer device 510 would have its own operating system 510a, which has multiple programs 510b1-n, including a test application 510b1 (not shown separately). Often the testing computer device 510 with operating system 510a and programs 510b1-n is actually a custom, dedicated PC, and as such it has to contain drivers or DLLs, data tables, and configuration data 510c1-n for all the phones to which it may be connected.

The data tables and configuration data also may contain any known combination of programs and drivers, comprising combinations that are known to be functional, as well as the ones that are known to have problems. Thus the table can indicate the existence of one or more problems. Further, enhanced test functionality is created by downloading an additional diagnostic program 502 that supports additional manipulation and tests beyond factory diagnostic program 501 in the DUT 101. As a result of having a large library of DLLs (or drivers, used interchangeably here) almost any data transfers between two different phones can be accomplished.

The testing computer device 510 can, by using the DLLs, communicate and download the data objects (each item typically comes down as one or more data objects from the phone), which are then stored in testing computer device 510 temporarily and eventually sent on to the other phone, as its data objects, using the matching DLL. It will be understood by those in the art that each of these devices has a CPU and memory, both volatile and nonvolatile, and thus each forms a small, distinct computing device.

Figure 6:
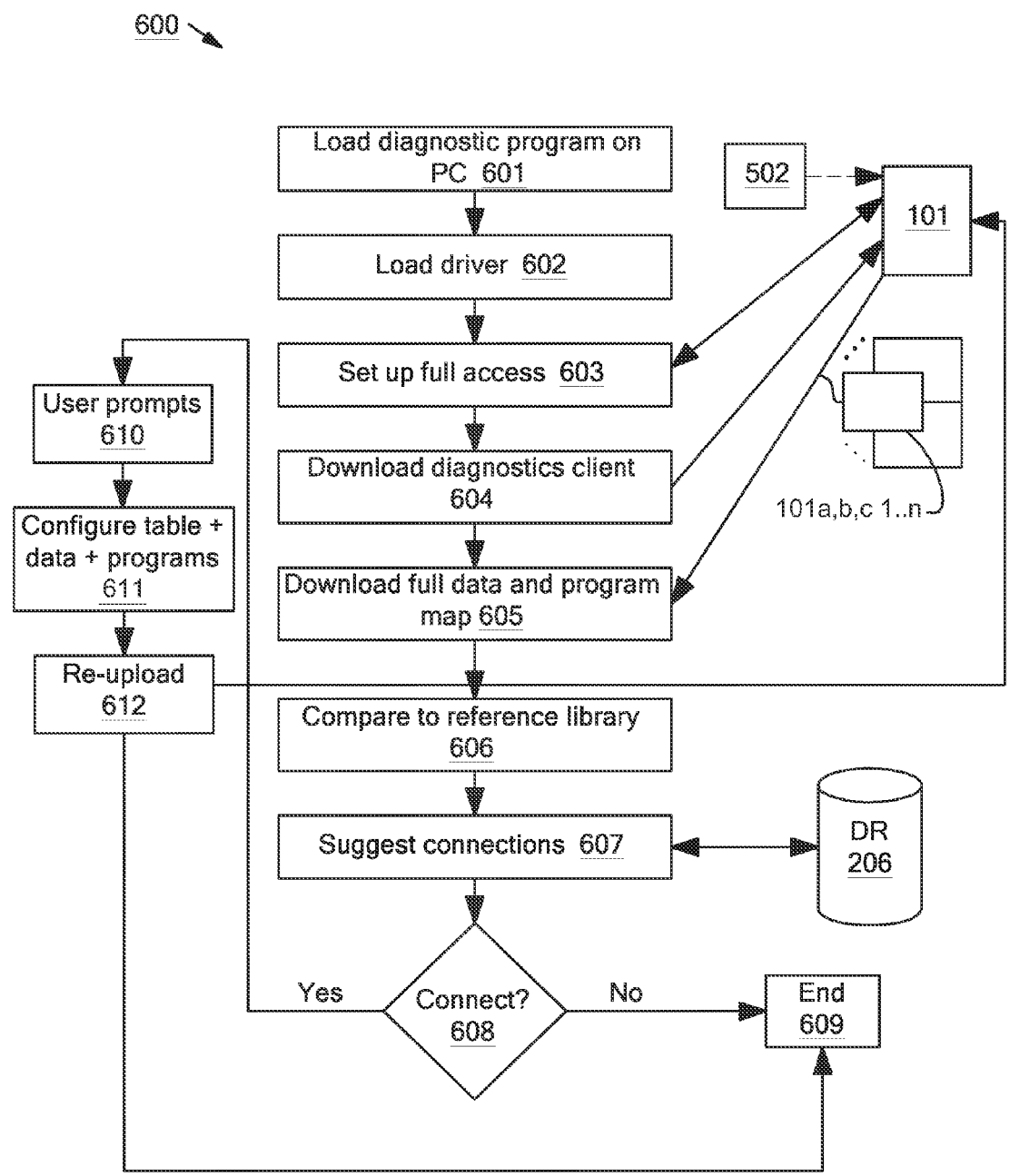
FIG. 6 shows an exemplary process for implementation of the enhanced system test software according to aspects of the disclosed subject matter.

FIG. 6 shows an example of a process 600 for implementation of additional enhanced system test software. In operation 601a diagnostic program is loaded into a PC, such as the testing computer device PC 510. In operation 602 the driver for device under test is loaded, allowing connection between testing computer device 510 and DUT 101. In operation 603 full access to DUT 101 is set up. In operation 604 the enhanced diagnostics 502 are downloaded into DUT 101, which diagnostics permit access to data not normally available through previously known access methods for any of various reasons, including but not limited to security restrictions. This may include in some cases one or more of the following: application launch, battery state and discharge rate, other relevant OS information, global positioning system ("GPS") and network data at that moment, etc.

In operation 605 a full data and program map, e.g., 101a, b and c[1-n] is downloaded into PC 510 from the DUT 101. In operation 606 the downloaded data is compared to a reference library that may reside in data repository 206 on server 204, or it may be downloaded from a source via the Internet, or via some local intranet. This comparison can show which data from device 101 may be good and which data may have problems. In operation 607 results of the comparison of operation 606 are flagged with suggested corrections, such as, for example, removing certain programs, or updating or modifying certain configurations, or updating certain of the software or firmware of device 101 to ensure that the configuration of device 101 is functionally compliant with the most recent data stored in the data repository.

In operation 608, the system 600 may offer an option of automatic reconfiguration. If the option is not offered or not accepted (no), the process moves to operation 609, where it ends. If the option is offered and accepted (yes), the process moves to operation 610, where the person executing the implementation of the system (process 600) is prompted on a per-item basis to accept one or more updates and/or modifications. This manual, per-item selection of updates and/or modifications is necessary because some updates and/or modifications may cause loss of data and/or applications, which the user may be unwilling to endure.

In operation 611, the accepted updates and/or modifications are executed, including configuring data, programs, and tables per user options. In operation 612 the modified material is uploaded into the DUT 101. Upon completing the uploading, the process moves to operation 609, where it ends. These diagnostics with data table comparison capabilities may also have a reminder ("nag") function that prompts the user to load updates that were not accepted in operation 610. For example, a user may have been in a situation, such as on a business trip, where the user did not trust the connection, or the security, or did not have time, or for some other reason, and preferred to wait until a more convenient time and place.

Also, the system 600 may require an account password or other security mechanism to prevent unauthorized people from changing the DUT configuration. Logs of the functions may be transmitted to a server in, e.g., a network operation center, allowing review of all past transactions by any technician who is attempting to assist the customer. Additional function that may be included may be features such as radio tagging, field strength and GPS tracking, or other add-ons.

According to aspects of embodiments of the disclosed subject matter, a system and method are provided that allows the exchange of any kind of object between two phones, whether exchange is originally supported by these phones or not, in a secure and safe manner. Such an exchange may be accomplished, for example, over Bluetooth, infrared, or other connection types that are well known. As discussed above, the ability to insert diagnostic tools into a phone, and more specifically, the ability to insert software into a phone, is known to the inventors.

Figure 7:
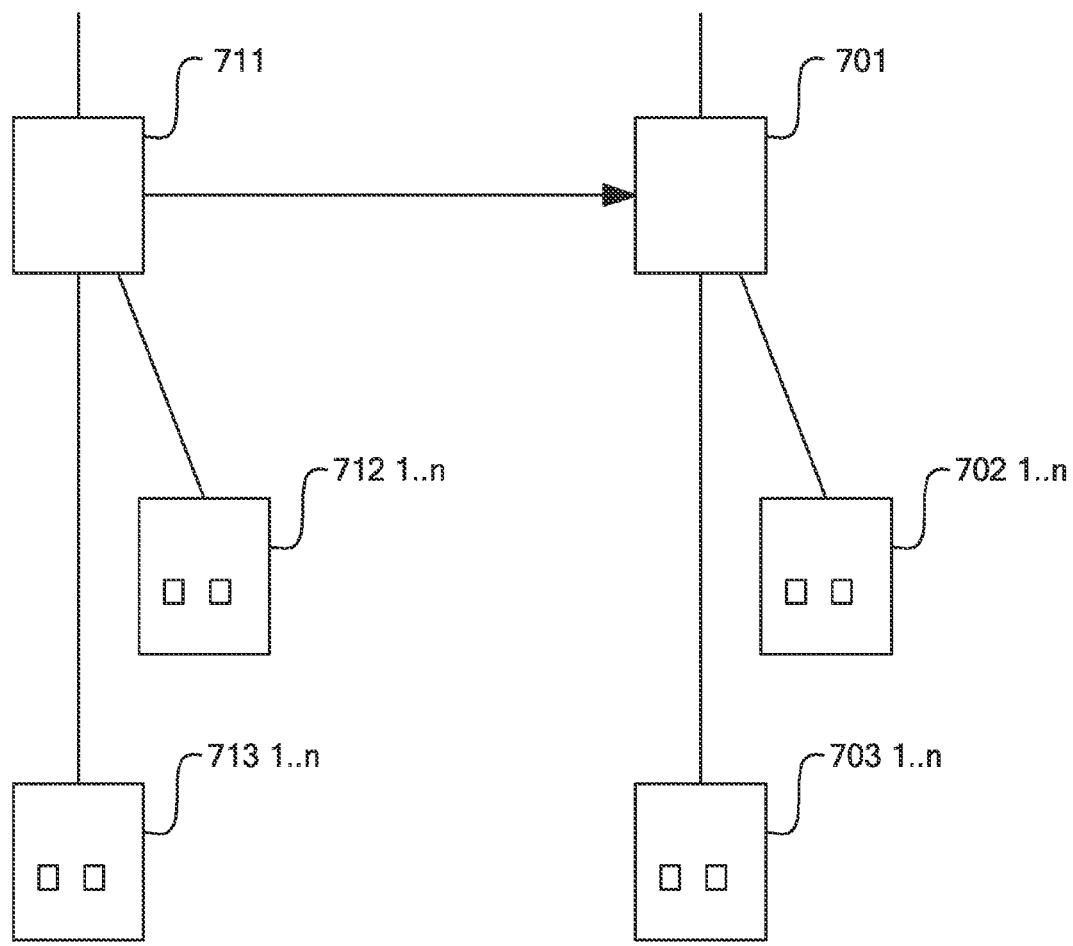
FIG. 7 shows an example of two phones communicating with each other, as can be utilized according to aspects of an embodiment of the disclosed subject matter.

FIG. 7 shows a simplified overview of two phones, 701 and 711, that are communicating with each other, according to one embodiment of the disclosed subject matter. Each phone 701 and 711 has its own store 7021-n and 7121-n, respectively, of software, such as, for example, programs. Similarly, each phone 701 and 711 has a set of data objects 7031-n and 7131-n, respectively. In the manner described above, the phone initiating communication, in this case phone 711, is sending a diagnostic program, which in this example is a file plan for a utility, to phone 701.

Figure 8:
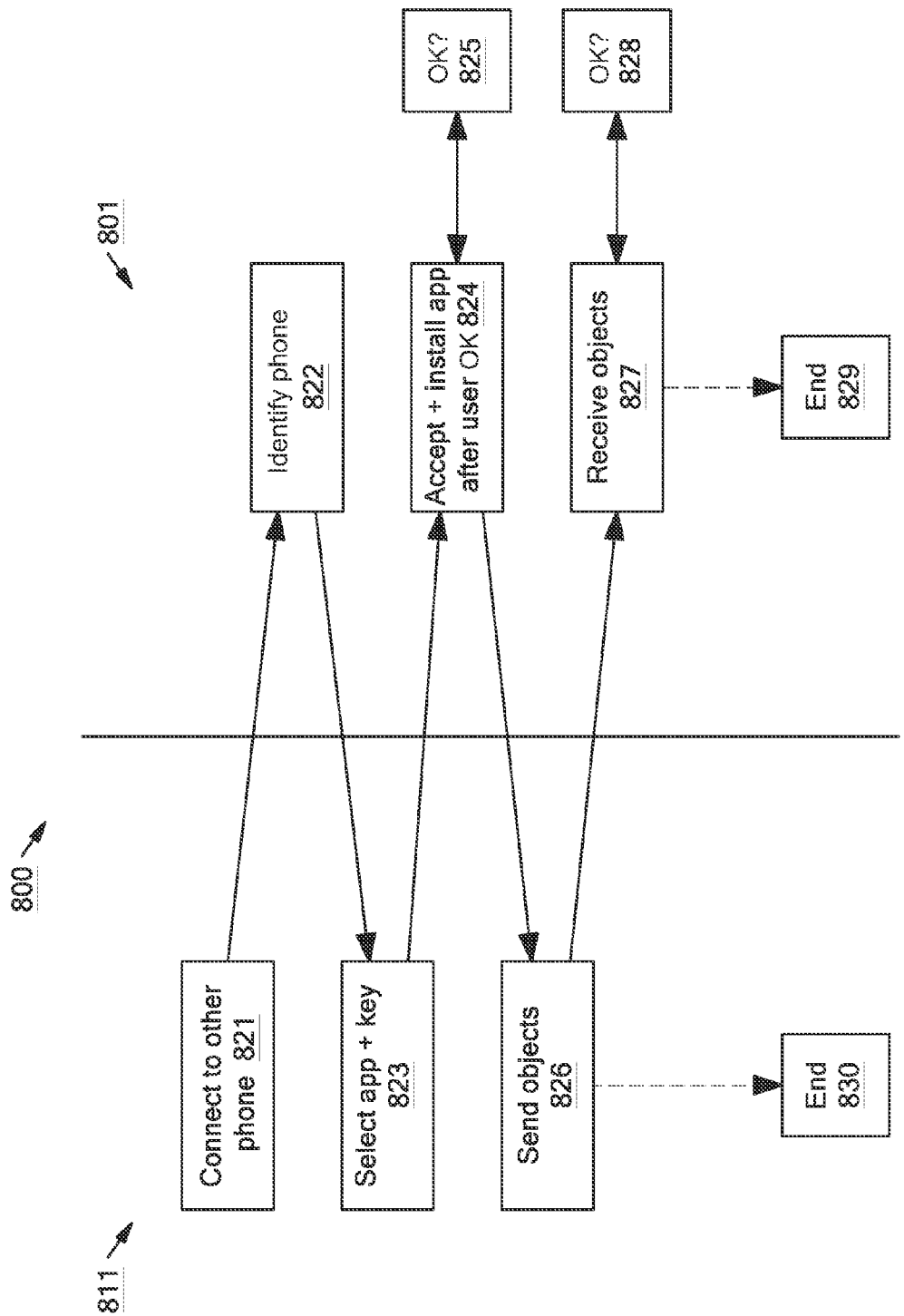
FIG. 8 shows an example of a process for the interaction between two mobile phones, useful within aspects of an embodiment of the disclosed subject matter.

FIG. 8 shows an example of a process 800 for the interaction between the two phones, according to aspects of one embodiment of the disclosed subject matter. The two communication streams are stream 811 (for phone 711) and stream 801 (for phone 701). In operation 821, the initializing phone (in this example, phone 711) connects to the other phone (in this example, phone 701). In operation 822, phone 701 identifies phone 711.

In operation 823, based on the identification, an application and key, as explained below, that is suitable for the object phone 701 is taken from an application store, which forms part of the program store 712 (shown in FIG. 7), and transferred to phone 701. Typically, the security system of the phone 701 asks the user to confirm this transfer (block 825), and upon acceptance, in operation 824, phone 701 accepts and installs the application and key.

The key may be used to set up a trusted relationship between the two phones for the future, similar to the relationship between nodes in a home or workgroup network as is known in the art. Different types of settings may be offered, such as, for example, "Always allow" or "Always ask" in the case of a request to transfer data. In operation 826, initiating phone 711 sends a selected object(s) to receiving phone 701, and in operation 827, phone 701 receives the object. The user may be prompted to accept the object (block 828), particularly depending on the nature of the object. This process 800 may continue until all desired objects are transferred.

In some cases, the transfers may be bidirectional; in other cases, they are only unidirectional. Both phones 701, 711 end their communications in operation 829 and 830, respectively, after which a new session must be started again from operation 821 to send more data. When the application is installed, depending on its permission settings, it may remain in the phones 701, 711 and permit new connections for data transfers without reinstallation, or it may allow such connections only with user approval. However, in other cases, the application may be deleted after each session for purposes of security.

Figure 9:
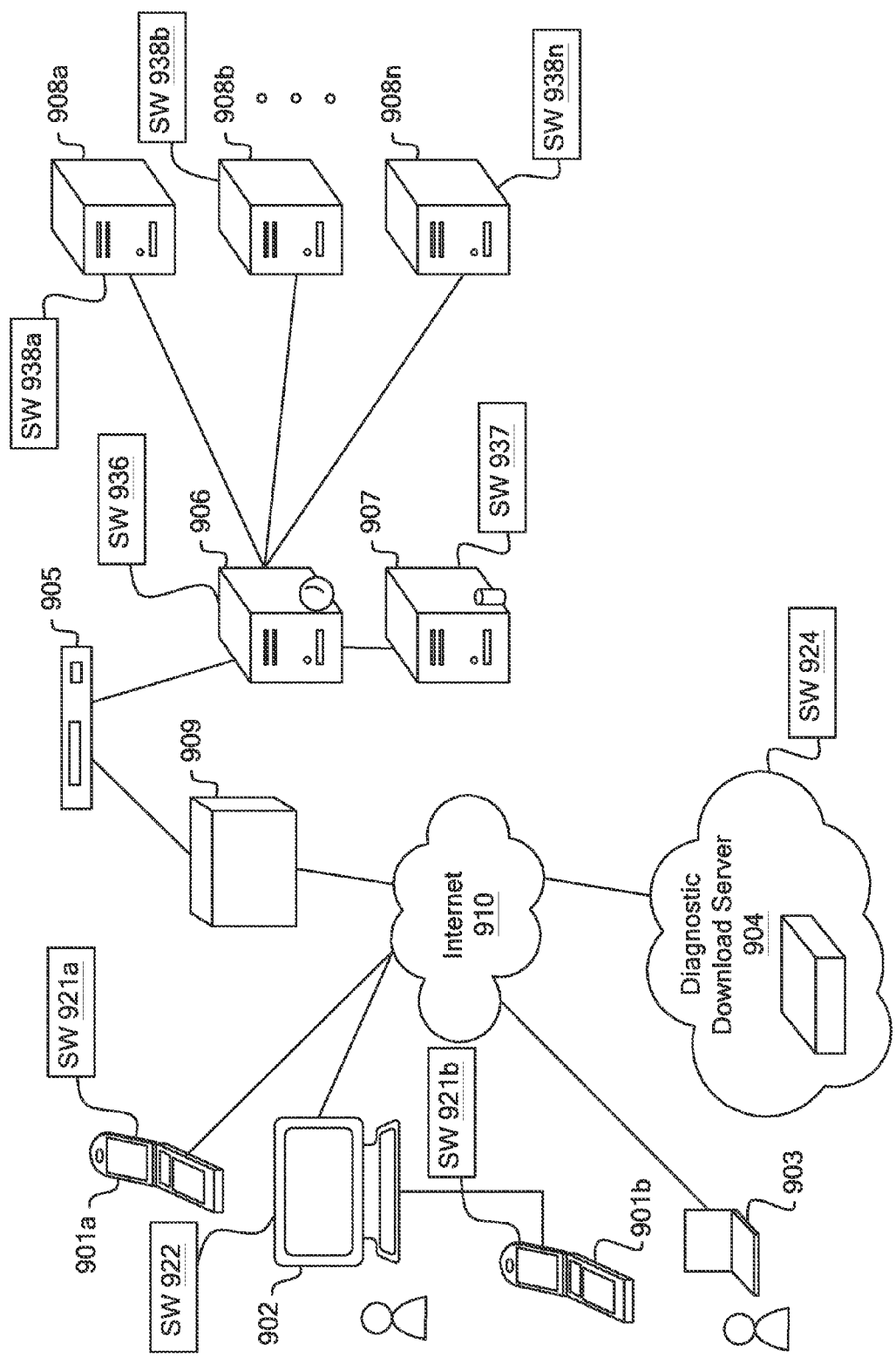
FIG. 9 shows an example of a system and method for enhanced diagnostics according to aspects of the disclosed subject matter.

FIG. 9 shows an overview of an exemplary system 900 for enhanced diagnostics according to one aspect of the system and method disclosed herein. The devices under test (DUTs) are client devices 901a and 901b. DUT 901a connects to the Internet 910 via a wireless connection (over a network, not shown). DUT 901b is connected to a computer 902. Software instances 921a and 921b are testing DUTs 901a and 901b, respectively. Also, software 922, such as interconnectivity software or a special driver, may reside the desktop computer 902. Between Internet 910 and load balancer 905 is a firewall 909.

Often the firewall 909 and the load balancer 905 may be combined. Also shown is a main diagnostic server 906, which in this case could be one or more servers. Server 907 manages a diagnostic database. All servers 906 and 907 contain, respectively, software 936 and 937. Similarly, customer (i.e., carrier) systems 908a-n contain software instances 938a-n. Diagnostic server 906 may download diagnostic and background data as well as any other related data into server 904, which may be a local server in the domain of a network provider.

Server 904 contains software 924, which is a partial or full copy of the system and/or the data downloaded from server 906, or any of its connected servers. Administration console 903 may connect to one or more server(s), e.g., through the Internet 910 and/or load balancer 905. Typically, console 903 would not require special software to connect to such server(s), because web interface software could be used, requiring only a web browser. In some cases, however, special client software (not shown) may be downloaded from one of the servers, or a special browser plug-in may be downloaded to enhance performance and reduce overhead during operations.

Figure 10:
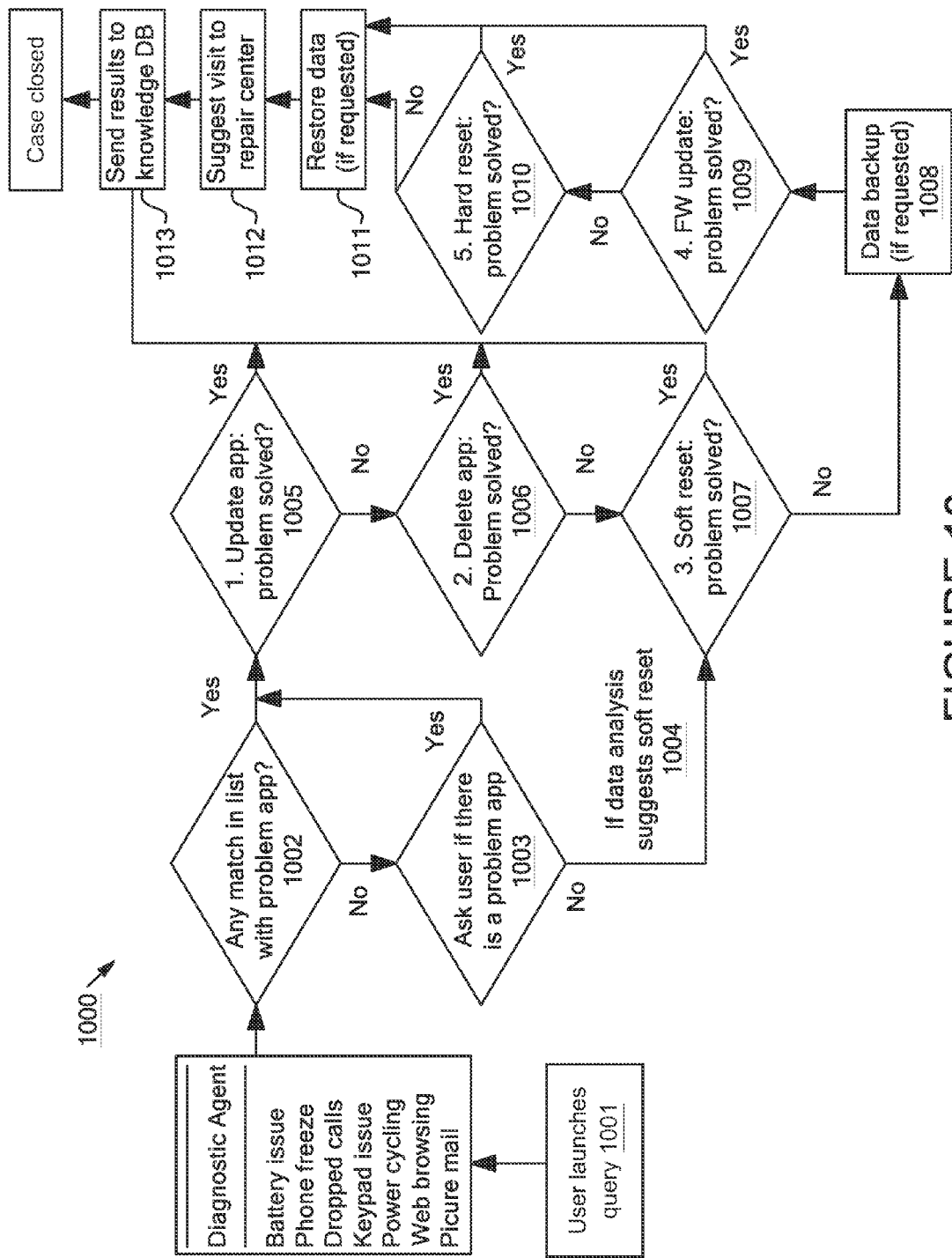
FIG. 10 shows an example of a process for implementation within a system and method according to aspects of the disclosed subject matter.

FIG. 10 shows an example of a process 1000 for implementation of aspects of the presently disclosed system according to one aspect of the system and method disclosed herein. In operation 1001, the user launches the diagnostic application and a "Diagnostic Agent" screen (1201, described in regard to FIG. 12 below) opens, wherein the user may select from a list (1201a-n in FIG. 12 also) the particular application with which the user needs help. In operation 1002 the system checks if there is an item in the list on the screen, and may have an "Other" field in the list, or in a different menu for the problem, e.g., an occurring error in the application. If no, in operation 1003 the system asks the user what the problem, i.e., error, is. If it turns out to be that the application exists, the system branches to operation 1005.

If there is no application, the process continues to operation 1004, where it suggests analysis steps outside the automatic venue, e.g., from a service representative assisting the user. The system then continues on to operation 1007, where it performs a soft reset of the device. In operation 1005, the system updates the application experiencing the problem, i.e., error. If the problem is solved, i.e., corrected, the process moves to operation 1013, where the system sends the results to the knowledge database. If the problem, i.e., error, is not solved, i.e., corrected, the process moves to operation 1006, where the system deletes the application and checks whether the problem, i.e., error, is solved, i.e., corrected. If yes, the process moves to operation 1013. In those cases, the offending application can be deleted as part of a trial remedy to resolve, i.e., correct, the error. If after deletion it is found that the application was not part of the error, then the application could need to be restored. Data backup and subsequent restore could, for example, and maybe is, employed in several sections and not necessarily as in this exemplary order. If the , i.e., error, is not solved, i.e., corrected, the process moves to operation 1007, where the system 1000 performs a soft reset of the device 901a, 901b.

If the problem is corrected, the process again moves to operation 1013; if the problem, i.e., error, is not corrected, the process moves to operation 1008, where the system 1000 performs a data backup and then moves to operation 1009, where it updates the device 901a, 901b firmware. If the error is corrected, the process 1000 moves to operation 1011, where the system 1000 restores the data. If the error is not corrected, the process 1000 moves to operation 1010, where the system 1000 performs a hard reset. If the error is corrected, the process 1000 moves to operation 1011, where the system 1000 restores the data. If the error is not corrected, system 1000 notes the failure but still moves to operation 1011 and restores the data. After restoring the data in operation 1011, the system 1000 in operation 1012 suggests a visit to a repair center, and again in operation 1013 sends all results, i.e., problem correction information, via either wired or wireless communication means, back through the Internet cloud 910 to the field knowledge database server 907 for storage in the field knowledge database (1102 in FIG. 11) managed by the server 907.

Figure 11:
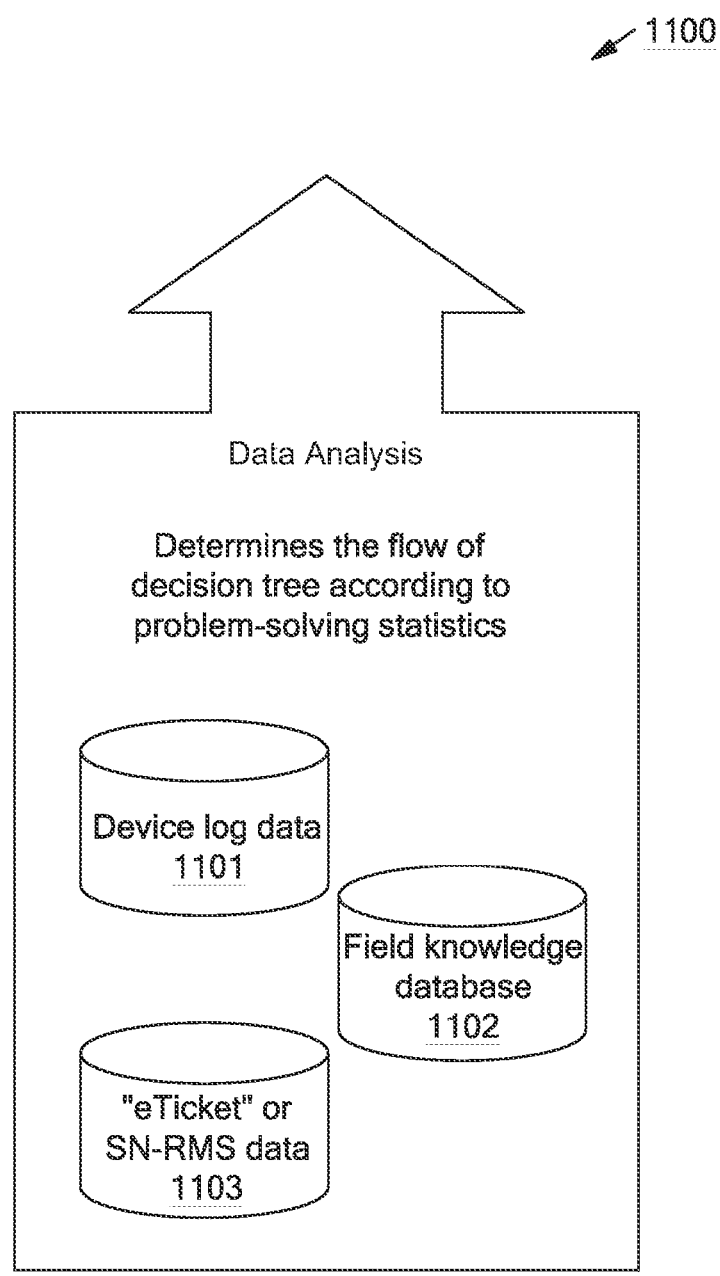
FIG. 11 shows an example of data flow, e.g., electronic Ticket or error report or other phone content management data such as SN-RMS data, analyzed according to aspects of an embodiment of the disclosed subject matter.

FIG. 11 shows an example of a data flow 1100 through a data decision tree according to problem solving statistics, e.g., including statistics of previous most probable cause(s) of an indicated error as it is analyzed. The initial "eTicket" data 1103 (electronic Ticket or error report or other phone content management data such as SN-RMS data) is analyzed in the device 901a or 901b respectively through the use of local software. If that software cannot determine the nature of the problem, the investigation is escalated to the field knowledge database 1102. If that examination does not yield a clear conclusion, a device log data 1101 can be pulled into the main diagnostic server 906 and further analyzed there. The device data log includes all available information, including one or more of, but not limited to application launch, memory and processor usage, battery status and usage, field strength and network ID, cell tower ID, GPS data if available and running processes etc.

Figure 12:
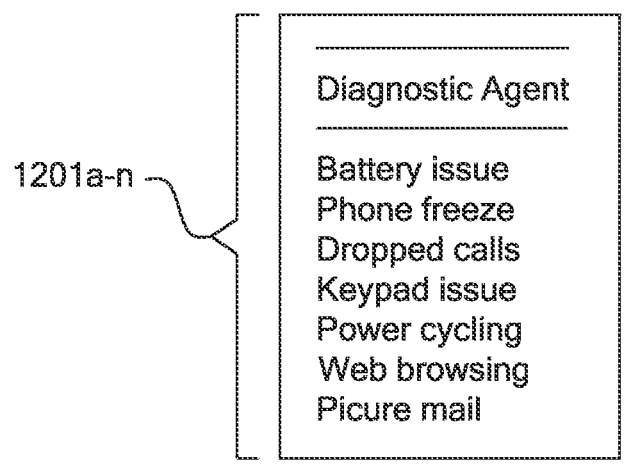
FIG. 12 shows an example of a screenshot, according to aspects of an embodiment of the system and method of the disclosed subject matter.

FIG. 12 shows an example of a typical screenshot 1200, according to one aspect of the system and method disclosed herein, which screen 1200 would appear in response to a user request for troubleshooting assistance or in response to a data analysis software conclusion that a problem exists. Screenshot 1200 offers the user a selection of options 1201 a-n for investigation. For example, if the user selects option 1201a, the battery issue, another screen opens, e.g., as shown in FIG. 13.

Figure 13:
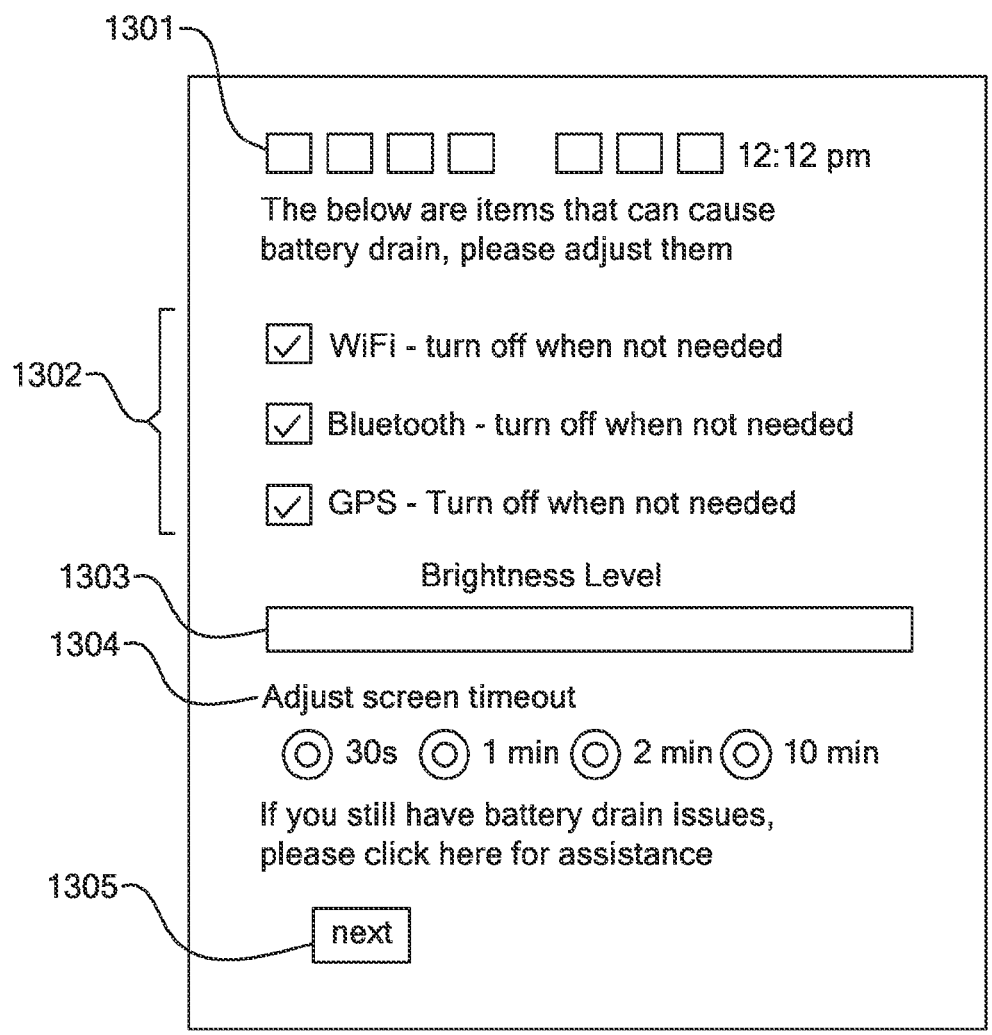
FIG. 13 shows an example of a screenshot, according to aspects of an embodiment of the system and method of the disclosed subject matter.

FIG. 13 shows an example of a typical screenshot 1300, according to one aspect of the system and method disclosed herein. At the top of the screen is an array 1301 of basic information about the device and its functions, for example, its network and its battery, current reception, etc. A list 1302 of functions that use battery power and that may be enabled or disabled is presented. Also shown is an option to control brightness level in bar 1303. Screen timeout selections 1304 let the user select the duration of screen illumination after any activity. One or more button(s) 1305 let the user move to the next step in the process. Additional buttons (not shown) may let the user test new settings or select other options.

Figure 14:
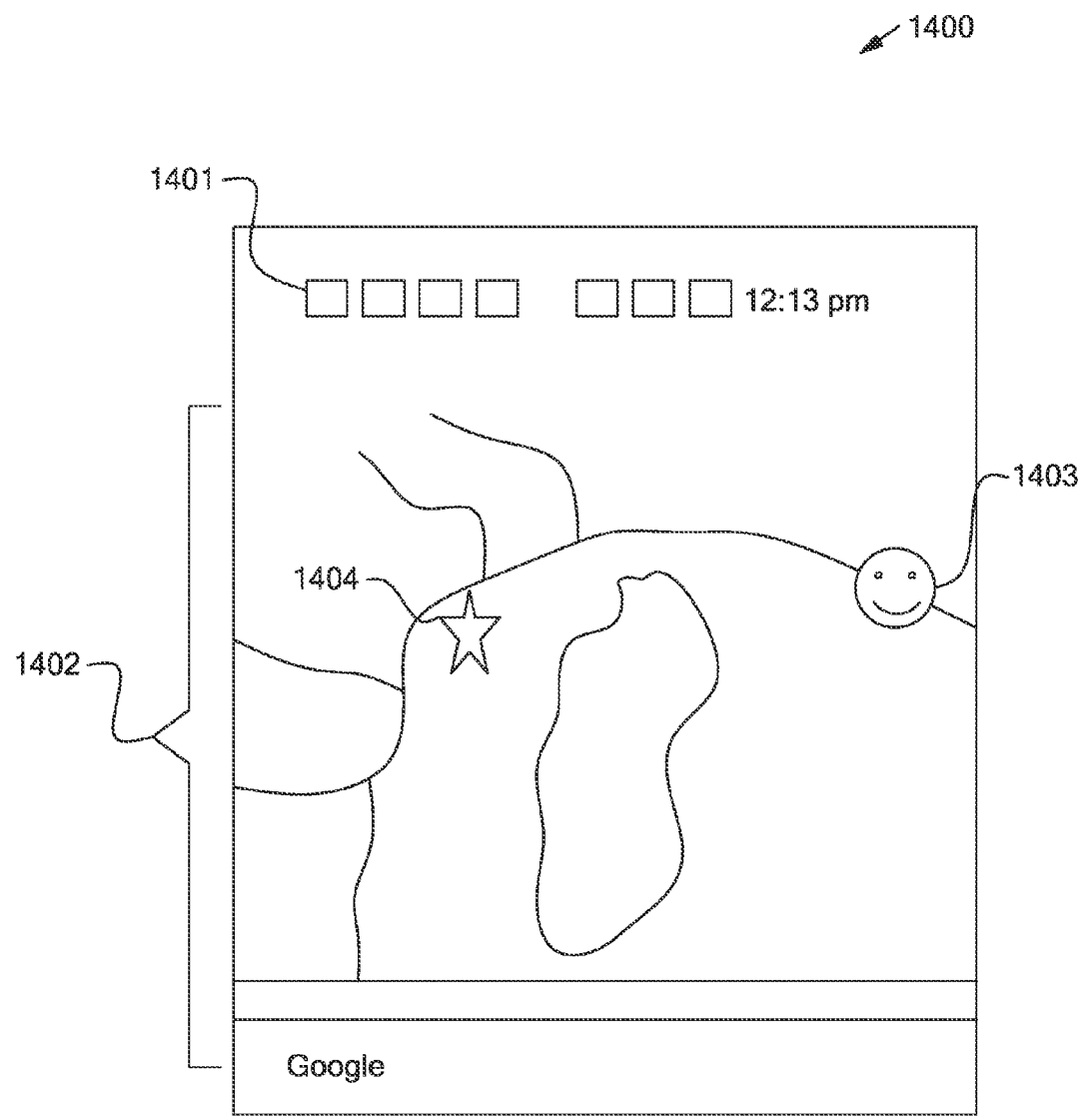
FIG. 14 shows an example of a screenshot, according to aspects of an embodiment of the system and method of the disclosed subject matter.

FIG. 14 shows an example of a typical screenshot 1400, according to one aspect of the system and method disclosed herein, which may open if the user selects a GPS option. Screenshot 1400 shows a map of a selected area. Array 1401 shows basic information about the device and about this particular function. Map 1402 shows the selected map, with face icon 1403 representing the user's location and star icon 1404, the desired destination, typically in this use, the nearest available user device service location.

Figure 15:
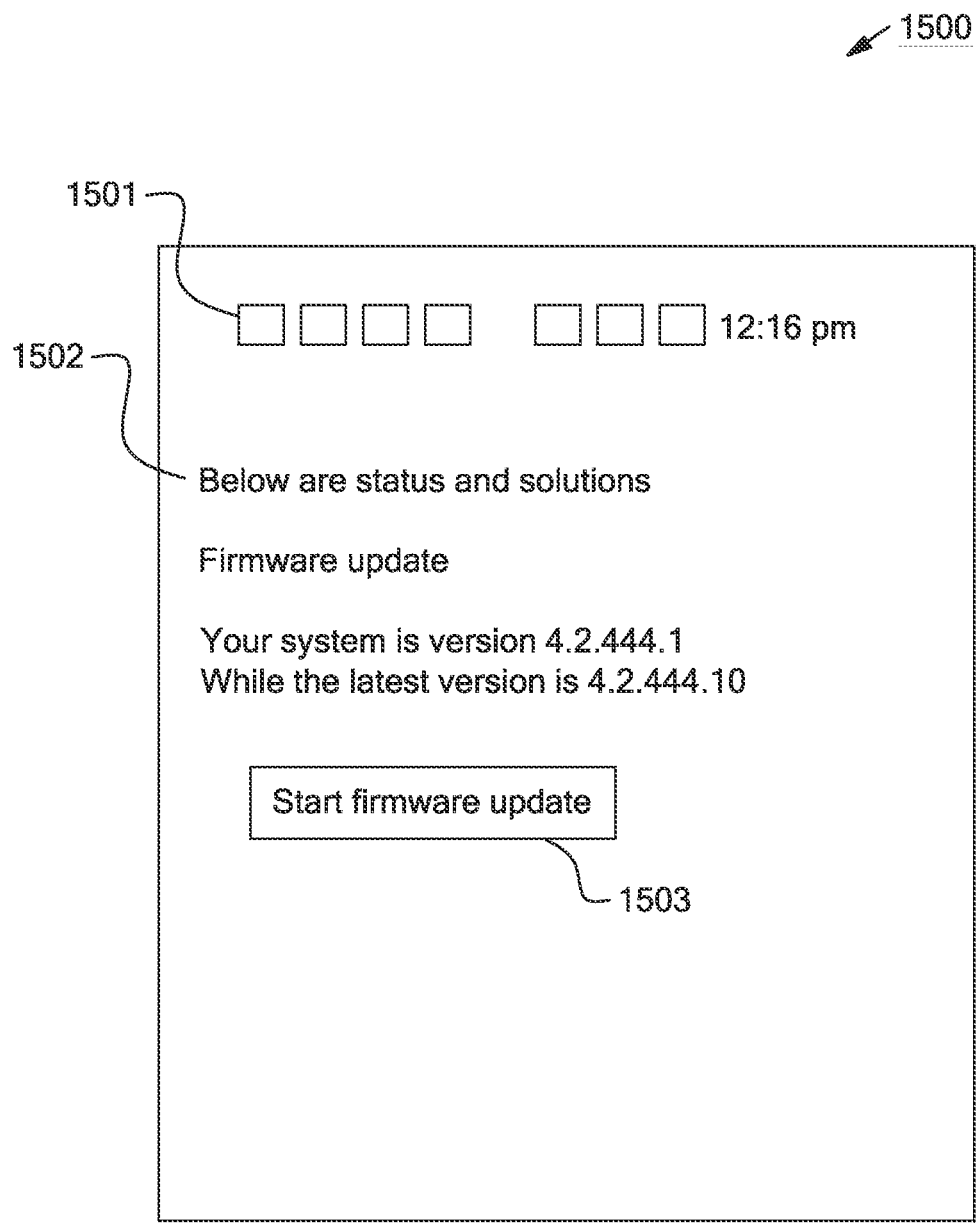
FIG. 15 shows an example of a screenshot, according to aspects of an embodiment of the system and method of the disclosed subject matter.

FIG. 15 shows an overview of an exemplary typical screenshot 1500, according to one aspect of the system and method disclosed herein, which shows the user that the diagnostic program recommends a firmware upgrade. Array 1501 shows basic information about the device and about this particular function. Message 1502 informs the user of the recommended action and gives some of the findings of the diagnostic software, and button 1503 prompts the user to start the recommended action. Starting a firmware upgrade may include such system actions as checking that reception quality is adequate, that the user is not driving or flying, that battery level is adequate to complete the task without crashing during the process, and that there is enough space in the device's flash storage to ensure that user information is not overwritten. In some cases, the system may back up user information over the network 910 before beginning the upgrade.

Figure 16:
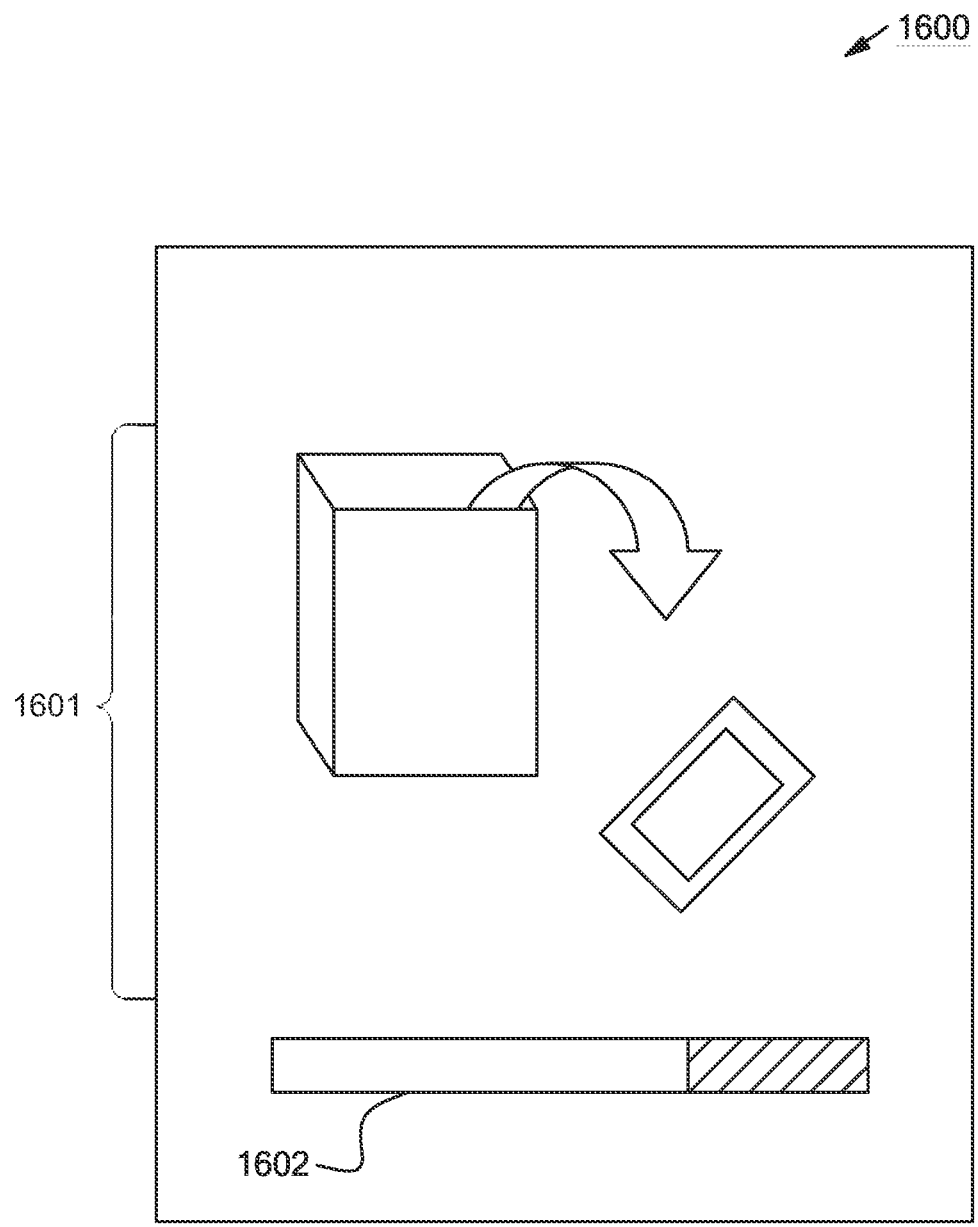
FIG. 16 shows an example of a screenshot, according to aspects of an embodiment of the system and method of the disclosed subject matter.

FIG. 16 shows an example of a typical screenshot 1600, according to one aspect of the system and method disclosed herein, of the type that the system may display to the user on the device 901a, 901b during, e.g., a firmware upgrade. Graphic 1601 indicates that new firmware is moving onto the device 901a, 901b, while progress bar 1602 shows the user the progress of the operation.

It will be understood by those skilled in the art that a system and method for diagnosing problems in a mobile telecommunication user devices is disclosed which may comprise recording, via a computing device, activities of the user device; diagnosing an error, via the computing device, responsive to one of a system monitor and a user recognizing the error; and providing to the user, via the computing device an initial suggestion of possible counteraction to the error, based upon information received from diagnostic software running on the user device.

The system and method may further comprise presenting to the user, via the computing device, at least one possible solution from a series of escalating possible solutions to diagnose the problem at the mobile telecommunication user device, and wherein the last of the possible solutions provides a suggestion to the device user to visit a nearest available service location and the method further may comprise providing, via the computing device, a map to the service location.

The system and method may further comprise providing to a device user, via a communication network, in response to one of a user request for troubleshooting assistance and a mobile telecommunications user device monitoring software conclusion that a problem exists, a diagnostic application specific to the mobile telecommunication user device of the device user; receiving from the device user, via the communication network, an indication of a problem with the mobile telecommunication user device experienced by the device user; selecting, via a computing device, an application update; providing to the device user, via the communication network, the application update updating an application running on the mobile telecommunication user device; and determining, via the computing device, whether the problem has been solved. The system and method, therefore, can comprise diagnosing an error, via the computing device, responsive to one of a system monitor and a user identifying the error; and providing to the user, via the computing device, a corrective procedure, based upon information identified by a diagnostic process on the user device.

The system and method may further comprise wherein determining indicates that the problem has not been solved and deleting, via the computing device, the application; and further determining, via the computing device, whether the problem has been solved. If further determining indicates that the problem has not been solved the system and method may further comprise performing, via the computing device a soft reset of the mobile telecommunication user device and, if after the soft reset the problem has not been solved the system and method may further comprise performing, via the computing device, at least one of a data backup and a firmware update of the mobile telecommunications user device. The system and method may further comprise when determining or further determining indicates the problem has been solved, forwarding, via the computing device, problem solution data to a knowledge database.

The system and method may further comprise when a firmware update of the mobile telecommunications user device fails to solve the problem, performing, via the computing device, a hard reset of the mobile telecommunications user device, followed by at least one of a data restoration and a suggestion for the device user to visit a mobile telecommunications user device repair center and forwarding, via the computing device, problem solution data to the knowledge database.

The system and method may further comprise, when the removal of the application fails to solve the problem, restoring the application to the mobile telecommunication user device. The system and method may further comprise providing to the device user, via a communication network, a diagnostic application specific to a mobile telecommunication user device of the telecommunication device user for launch on the mobile telecommunication user device by the device user and providing to the device user, via a communication network, a device feature diagnostic list of applications specific to a mobile telecommunication user device of the telecommunication device user for selection from the list by the device user to indicate an existing problem with an application selected from the list and receiving from the device user, via a communication network, a selection of an application from the list.

The system and method may further comprise a tangible machine readable medium storing instructions that, when executed by a computing device, cause the computing device to perform a method, the method comprising as an example providing to a device user in response to one of a user request for troubleshooting assistance and a mobile telecommunications user device monitoring software determination that a problem exists, a diagnostic application specific to the mobile telecommunication user device of the device user; receiving from the device user an indication of a problem with the mobile telecommunication user device experienced by the device user; selecting an application update; providing to the device user the application update updating an application running on the mobile telecommunication user device; and determining whether the problem has been solved.

It is clear that many modifications and variations of this embodiment may be made by one skilled in the art without departing from the spirit of the novel art of this disclosure. These modifications and variations do not depart from the broader spirit and scope of the invention, and the examples cited here are to be regarded in an illustrative rather than a restrictive sense. For example, the application for determining if a mobile phone device is defective can be loaded onto the device from another computing device either in the store or over the network. Said application analyzes for problems in at least one of hardware, software and configuration. Further, in some cases, said application may be downloaded from a computing device connected with a cable or a local area wireless connection. In other cases, it may be downloaded over the wireless wide area communication network, even at the service location, or anywhere else. In some cases, said application continues to run after the local test, and then subsequently transmits information about key events to a server on the communication network. In some cases, said application will request a user password to verify the user wishes to have it installed, and is the authorized user of the device. In some cases, the data transmitted contains at least one of the following types of events, crashes of the device, other application crashes or hang-ups, loss of signal, location, loss of battery power, loss of connection, user configuration changes, user application installation and removals, data synchronization, inserting or removing data cards, and wherein the events are time stamped, and in case of a subsequent crash, the event log is transmitted after the mobile device regains functionality.

It is also clear that many other modifications and variations of the embodiments disclosed in the present application may be made by one skilled in the art without departing from the spirit of the novel art of this disclosure. For example, both a system and ore a method for diagnosing problems in a mobile telecom device are shown. The system (and the method) work by automatically recording activities of the device, and when either the system, (both locally or in one or more of the connected serves) or the user recognize an error, software will diagnose said error. Typically, an initial suggestion of possible counteraction is offered by software on the device itself to the user. In some further cases, the user is taken through a series of escalation steps, in trying to address the problem locally. Furthermore, in some cases, as a last step, a map is shown with the nearest available service location. These modifications and variations do not depart from the broader spirit and scope of the invention, and the examples cited here are to be regarded in an illustrative rather than a restrictive sense.

What is claimed is:

1. A computing device for diagnosing problems in a mobile telecommunication user device, the computing device comprising a processing module coupled to a memory having stored thereon a set of instructions which when executed by the processing module cause the processing module to:
   record activities of the user device and data from a storage of the user device;
   transmit the storage data of the user device to a data repository;
   receive an indication of an error at the user device from one of a system monitor or a user identification of the error;
   transmit enhanced diagnostics to the user device in response to the indication;
   obtain a data and program map of the user device from the enhanced diagnostics;
   diagnose the error by comparing information from the data and program map to the storage data of the user device in the data repository;
   present to the user serially possible solutions one after another from a series of escalating possible solutions to resolve the error at the user device based upon the diagnosis, wherein the series of escalating possible solutions include:
      updating, via a communication network, a specific application in the mobile telecommunication user device;
      deleting, via the computing device, the specific application:
      performing, via the computing device, a soft reset of the mobile telecommunication user device;
      performing, via the computing device, a firmware update of the mobile telecommunication user device;
      performing, via the computing device, a hard reset of the mobile telecommunication user device;
      providing, via the computing device, a data restoration on the mobile telecommunication user device; and
      as a last one of the series, a suggestion for a user of the user device to visit a nearest available service location;
   escalate, by the computing devices, through the series of escalating possible solutions one after another to resolve the error; and
   forward, by the computing device, error correction data for resolving the error to a knowledge database.

2. A method comprising:
   recording, by a computing device, activities of a mobile telecommunication user device and storage data retrieved from a storage of the mobile telecommunication user device;
   transmitting, by the computing device, the storage data of the mobile telecommunication user device to a data repository;
   providing, by the computing device, a diagnostic application to the mobile telecommunication user device via a communication network;
   obtaining, by the computing device, a data and program map of the mobile telecommunication user device from the diagnostic application;
   comparing, by the computing device, information from the data and program map to the storage data of the mobile telecommunication user device in the data repository;
   detecting, by the computing device, an error existing in the mobile telecommunication user device based on the comparing;
   selecting, by the computing device, a first possible solution from a series of escalating possible solutions for resolving the error, wherein the series of possible escalating solutions comprise:
      updating, via the communication network, a specific application in the mobile telecommunication user device;
      deleting, via the computing device, the specific application;
      performing, via the computing device, a soft reset of the mobile telecommunication user device;
      performing, via the computing device, a firmware update of the mobile telecommunication user device;
      performing, via the computing device, a hard reset of the mobile telecommunication user device;
      providing, via the computing device, a data restoration on the mobile telecommunication user device; and
      as a last one of the series, a suggestion for a user of the user device to visit a nearest available service location;

escalating, by the computing devices, through the series of escalating possible solutions one after another to resolve the error; and forwarding, by the computing device, error correction data for resolving the error to a knowledge database.

3. The method of claim 2, further comprising:

providing, via the computing device, a map to the service location.

4. The method of claim 3, further comprising:

launching the diagnostic application specific to the mobile telecommunication user device on the mobile telecommunication user device.

5. The method of claim 3, further comprising:

providing to the mobile telecommunication user device, via a communication network, a device feature diagnostic list of applications corresponding to the mobile telecommunication user device for selection from the list the specific application.

6. The method of claim 5, further comprising:

receiving from the user device, via a communication network, a selection of the specific application from the list.

7. The method of claim 3, further comprising:

detecting, by the computing device, storage capacity of the mobile telecommunication user device; and receiving, by the computing device, the storage data from the mobile telecommunication user device for transmission to the repository in response to the storage capacity reaching a preset threshold of occupied space.

8. The method of claim 3, wherein after a determination that removal of the specific application fails to correct the error and the method further comprises restoring the specific application to the mobile telecommunication user device.

9. A non-transitory machine readable medium storing instructions that, when executed by a computing device, cause the computing device to perform a method, the method comprising:

recording activities of a mobile telecommunication user device and data from a storage of the mobile telecommunication user device;

transmitting the storage data of the mobile telecommunication user device to a data repository;

providing to the mobile telecommunication user device, a diagnostic application specific to the mobile telecommunication user device;

obtaining a data and program map of the user device from the diagnostic application;

comparing information from the data and program map to the storage data of the mobile telecommunication user device in the data repository;

detecting an error existing in the mobile telecommunication user device based on the comparison;

selecting a first possible solution from a series of escalating possible solutions for resolving the error, wherein the series of possible escalating solutions comprise:

updating, via a communication network, a specific application in the mobile telecommunication user device;

deleting, via the computing device, the specific application;

performing, via the computing device, a soft reset of the mobile telecommunication user device;

performing, via the computing device, a firmware update of the mobile telecommunication user device;

performing, via the computing device, a hard reset of the mobile telecommunication user device;

providing, via the computing device, a data restoration on the mobile telecommunication user device; and as a last one of the series, a suggestion for a user of the user device to visit a nearest available service location;

escalating, by the computing devices, through the series of escalating possible solutions one after another to resolve the error; and forwarding, by the computing device, error correction data for resolving the error to a knowledge database.

\* \* \* \* \*